(12) United States Patent
Seifert

(10) Patent No.: US 7,450,808 B2
(45) Date of Patent: Nov. 11, 2008

(54) OPTICAL FIBER ARTICLE AND METHODS OF MAKING

(75) Inventor: Martin Seifert, West Simsbury, CT (US)

(73) Assignee: Nuffern, East Granby, CT (US)

( * ) Notice: Subject to any disclaimer, the term of this patent is extended or adjusted under 35 U.S.C. 154(b) by 0 days.

(21) Appl. No.: 11/178,011

(22) Filed: Jul. 8, 2005

(65) Prior Publication Data

US 2007/0009217 A1    Jan. 11, 2007

(51) Int. Cl.
*G02B 6/02*    (2006.01)
(52) U.S. Cl. .................. 385/127; 385/123; 385/124; 385/125; 385/126
(58) Field of Classification Search .......... 385/123–127
See application file for complete search history.

(56) References Cited

U.S. PATENT DOCUMENTS

| | | |
|---|---|---|
| 3,436,141 A | 4/1969 | Comte |
| 3,583,786 A | 6/1971 | Marcatili et al. |
| 4,930,863 A | 6/1990 | Croitoriu et al. |
| 5,729,646 A | 3/1998 | Miyagi et al. |
| 5,802,236 A | 9/1998 | DiGiovanni et al. |
| 5,815,627 A | 9/1998 | Harrington |
| 5,907,652 A | 5/1999 | DiGiovanni et al. |
| 5,995,696 A | 11/1999 | Miyagi et al. |
| 6,130,780 A | 10/2000 | Joannopoulos et al. |
| 6,418,258 B1 | 7/2002 | Wang |
| 6,463,200 B2 | 10/2002 | Fink et al. |
| 6,480,659 B1 | 11/2002 | Patlakh et al. |
| 6,563,981 B2 | 5/2003 | Weisberg et al. |
| 6,603,911 B2 | 8/2003 | Fink et al. |
| 6,606,440 B2 | 8/2003 | Hasegawa et al. |
| 6,625,364 B2 | 9/2003 | Johnson et al. |
| 6,788,864 B2 | 9/2004 | Ahmad et al. |

(Continued)

FOREIGN PATENT DOCUMENTS

WO    WO 99/00685    1/1999

(Continued)

OTHER PUBLICATIONS

Martin Seifert e-mail to R.W. Berdine entitled "Next Generation Fiber Laser Materials", dated Thursday, Feb. 17, 2005.

(Continued)

*Primary Examiner*—Jennifer Doan
(74) *Attorney, Agent, or Firm*—Peter J. Rainville

(57) ABSTRACT

A method of making an optical fiber article can include providing an optical fiber including at least a core; providing a preform; and subsequent to the foregoing providing of the optical fiber and the preform, drawing the preform so as to dispose a region about the optical fiber. An optical fiber article can include a core; a pump cladding disposed about the core, the pump cladding for propagating pump light; and a second cladding disposed about the pump cladding, where the second cladding can provide a photonic bandgap for tending to confine pump light to a region about which the second cladding is disposed. The second cladding can comprise a plurality of layers including a first layer having a different optical property than a second layer, and the plurality of layers can be arranged as to provide the photonic bandgap effect.

14 Claims, 6 Drawing Sheets

U.S. PATENT DOCUMENTS

| | | |
|---|---|---|
| 6,801,698 B2 | 10/2004 | King et al. |
| 6,879,386 B2 | 4/2005 | Shurgalin et al. |
| 6,895,154 B2 | 5/2005 | Johnson et al. |
| 7,142,756 B2 * | 11/2006 | Anderson et al. ........... 385/125 |
| 2002/0131742 A1 | 9/2002 | Bayart et al. |
| 2003/0039439 A1 | 2/2003 | Deliwala |
| 2003/0044159 A1 | 3/2003 | Anderson et al. |
| 2003/0059185 A1 | 3/2003 | Russell et al. |
| 2003/0165313 A1 | 9/2003 | Broeng et al. |

FOREIGN PATENT DOCUMENTS

| | | |
|---|---|---|
| WO | WO 99/64903 | 12/1999 |
| WO | WO 99/64904 | 12/1999 |
| WO | WO 01/42829 A2 | 6/2001 |
| WO | WO 01/42829 A3 | 12/2001 |
| WO | WO 2004/052078 A2 | 6/2004 |
| WO | WO 2004/052078 A3 | 11/2004 |

OTHER PUBLICATIONS

Martin Seifert e-mail to H.W. Leidecker entitled "Fibers coatings for extreme environments" dated Thursday, Feb. 17, 2005 and e-mail attachment entitled "New Polyimide Coatings for Glass Optical Fibers".

* cited by examiner

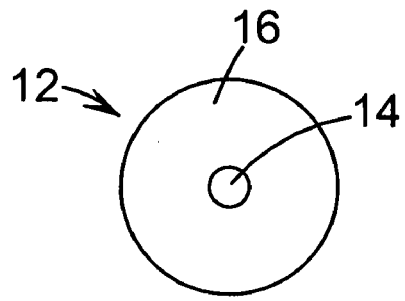
FIG. 1
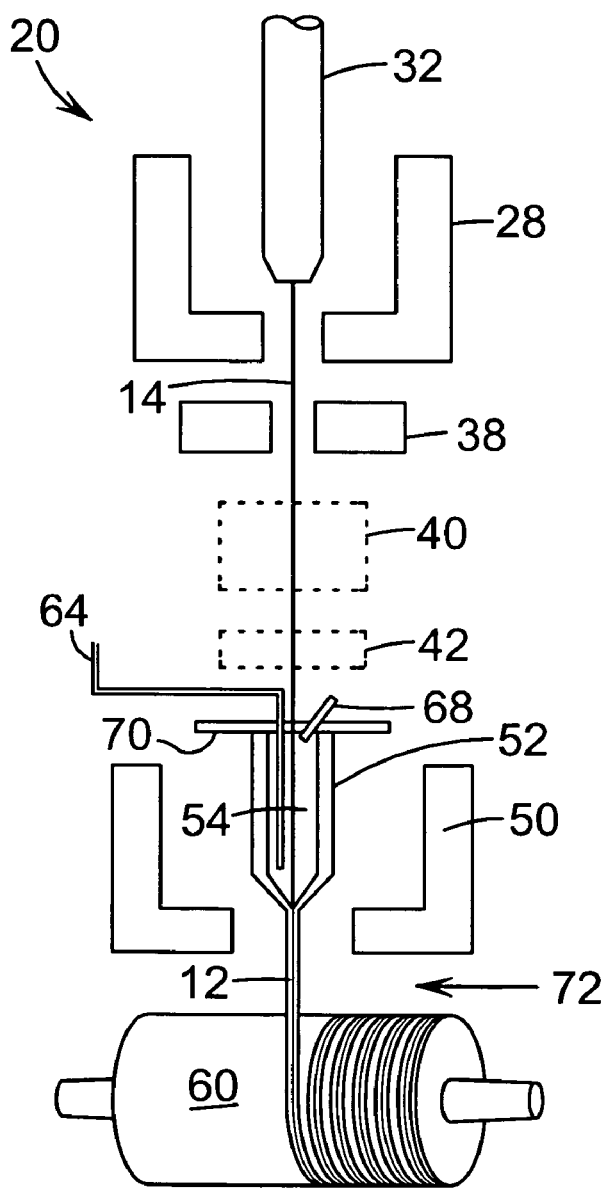
FIG. 2
FIG. 3

OPTICAL FIBER ARTICLE AND METHODS OF MAKING

FIELD OF THE INVENTION

The present invention relates to waveguides for propagating or guiding electromagnetic energy, such as, for example, optical fibers, and methods of making such waveguides.

SUMMARY OF THE INVENTION

In one aspect, the present invention provides a method of making an optical fiber article. The method can comprise providing an optical fiber comprising at least a core; providing a preform; and subsequent to the foregoing providing of the optical fiber and the preform, drawing the preform so as to dispose a region about the optical fiber. The preform can comprise a first polymer, and the first polymer can comprise a polyimide. The region can comprise a second polymer. The second polymer can be different than the first polymer, or the second polymer can be substantially identical to the first polymer. The preform can comprise a metal. The preform can comprise a first metal and a first polymer and the region can comprise a second metal and a second polymer. The first and second metals can be different or substantially identical, and/or the first and second polymers can be different or substantially identical. The preform can define an aperture and drawing the preform can comprise passing the optical fiber through the aperture.

Providing the preform can comprise providing a sheet material. The sheet material can be formed into a tube. Providing the preform can comprise fusing adjacent portions of the tube together. The tube can comprise a spiral of the sheet material. The sheet material can comprise a layer of a first material adhered to a layer of a second material that is different than the first material. The first material can comprise a metal and the second material can comprise a polymer. Providing the fiber can comprise drawing the fiber from an optical fiber preform. Drawing the fiber and drawing the preform to dispose the region about the optical fiber can occur substantially contemporaneously. Providing the optical fiber can include refraining from disposing a polymer protective region about the optical fiber. The method can comprise providing an adhesion promoter while drawing the preform for promoting adhesion of the region to the fiber. The adhesion promoter can comprise a silane.

In another aspect, the invention provides an optical fiber article having a longitudinal axis, the optical fiber article comprising a core for propagating light having a first wavelength; a pump cladding disposed about the core and for propagating pump light including a wavelength different than the first wavelength, where the pump cladding tends to confine light having the first wavelength to the core but does not tend to so confine the light having the first wavelength via a photonic bandgap effect; and a second cladding disposed about the pump cladding, where the second cladding provides a selected photonic bandgap for tending to confine pump light within a region about which the second cladding is disposed. The second cladding can be adjacent the pump cladding and the region to which the second cladding tends to confine pump light can comprise the pump cladding.

The optical fiber article can comprise a rare earth. The rare earth can comprise ytterbium. The pump cladding can be substantially homogeneous. The pump cladding can comprise a plurality of isolated features each having an optical property (e.g., an index of refraction) that is different than an optical property of material adjacent the features for providing the pump cladding with a selected geometric refractive index. The second cladding can comprise a plurality of isolated features each having an optical property (e.g., an index of refraction) that is different than material adjacent the features. The plurality of isolated features of one or both of the inner and second claddings can comprise a plurality of longitudinally extending voids.

The second cladding can comprise a plurality of layers including a first layer having a different optical property (e.g., index of refraction) than a second layer. The first layer can have an index of refraction that is higher than an index of refraction of the second layer. The plurality of layers can comprise at least a first layer that forms a spiral about the longitudinal axis. The plurality of layers can comprise a plurality of concentric closed rings. The optical fiber article can comprise an additional cladding disposed about the pump cladding, where the second cladding is disposed about the additional cladding and the additional cladding comprises an effective index of refraction that is less than the effective index of refraction of the pump cladding. The additional cladding can comprise a plurality of isolated features each having an index of refraction that is different than material adjacent the feature for providing the additional cladding with a selected geometric refractive index for tending to confine pump light to the pump cladding. The plurality of isolated features can comprise a plurality of longitudinally extending voids.

In yet an additional aspect, the invention provides an optical fiber article having a longitudinal axis, where the optical fiber article comprises a core; a pump cladding disposed about the core, where the pump cladding is for propagating pump light; and a second cladding disposed about the pump cladding, where the second cladding comprises a plurality of layers including a first layer having a different optical property than a second layer, and the plurality of layers are arranged so as to provide a photonic bandgap for tending to confine pump light to a region about which the second cladding is disposed. The first layer can have a higher index of refraction than the second layer. The optical fiber article can comprise a rare earth, which rare earth can comprise ytterbium. The plurality of layers can include at least a first layer that forms a spiral about the longitudinal axis. The plurality of layers can comprise a plurality of concentric closed rings. The optical fiber article can comprise an additional cladding disposed about the pump cladding, where the second cladding is disposed about the additional cladding, and the additional cladding comprises an effective index of refraction that is less than the effective index of refraction of the pump cladding. The additional cladding can comprise a plurality of isolated features each having an index of refraction that is different than material adjacent the feature for providing the additional cladding with a selected geometric refractive index for tending to confine pump light to the pump cladding.

The plurality of isolated features can comprise a plurality of longitudinally extending voids. The pump cladding can comprise a plurality of isolated features each having an index of refraction that is different than the index of refraction of material adjacent the feature. The plurality of isolated features contribute to providing a selected geometrical index of refraction for tending to confine light to the core, or can contribute to providing a selected photonic bandgap. The pump cladding can provide a selected photonic bandgap for tending to confine light to the core. The plurality of isolated features can comprise a plurality of longitudinally extending voids. The pump cladding can be substantially homogeneous.

It can be useful to comment on the distinction between the terms "refractive index"; "geometrical index"; and "effective index" as well as on the various technical mechanisms by which different types of fiber are understood to operate (without wishing to be bound by theory unless a mechanism of operation is expressly recited in the appended claims). The term "refractive index" (or "index of refraction") refers to the conventional refractive index of a material, such as, for example, a substantially homogeneous material (e.g., undoped or suitably doped silica glass). Most, if not all, materials can be characterized by a refractive index that can at least be estimated or at least determined to be different than another index of refraction. For example, the well-known Fresnel equations can provide an estimate of refractive index based reflection of light traveling in a medium of known refractive index (e.g., air) that reflects at normal incidence from another region whose refractive index is to be characterized. Metals are considered to have an index of refraction. Stating herein that a region includes an index of refraction does not mean that the index of refraction need be constant throughout the region. For example, the core of a conventional graded index fiber can include an index of refraction that is greater than an index of refraction of a cladding surrounding the core, but the index of refraction of the graded index core is not constant, as is well understood by one of ordinary skill in the art.

The geometrical index of a structure is the geometrical weighted index of the structure. Consider, for example, a structure consisting of a volume fraction of 40% air (refractive index of 1) and a volume fraction of 60% silica (refractive index of approximately 1.45). Such a structure has a geometrical refractive index of (0.4×1)+(0.6×1.45), which is 1.27. If such a structure is used as a cladding of, for example, an undoped silica core, the structure can in certain useful circumstances be considered to act on a macroscopic scale as having an index determined largely by the considerations of the geometrical index.

The effective refractive index, sometimes referred to as effective index, of a given structure for a selected wavelength or range of wavelengths is well known in the art. See, for example, Joannopoulos et al., "Photonic Crystals", Princeton University Press, 1995. See also, Broeng et al., Optical Fiber Technology, Vol. 5, pp. 305-330, 1999. A numerical method capable of solving Maxwell's equations in full vectorial form can be used for accurate determination of the effective indices of refraction of complex structures including photonic bandgap structures, where a region can include features that provide a selected Bragg condition or that provide for selected scattering. The foregoing Joannopoulos method is well documented in the literature. For certain structures and operating conditions (e.g., operating wavelengths), the effective index is roughly identical to the weighted average of the constituents of a region, that is, the effective index is roughly identical to the geometrical index. The effective refractive index can also be, in certain circumstances, substantially identical to the refractive index.

For simplicity the more general term "effective refractive index" or "effective index" will often be used herein, regardless of whether the region of the fiber under discussion is substantially homogeneous (defined below), includes features arranged such that the geometrical index is a useful concept, or includes features arranged so as to provide a selected photonic bandgap wherein a selected range of wavelengths is effectively prohibited from propagating in a selected manner in a region (e.g., a cladding). To provide a selected photonic bandgap, the features are typically smaller and/or more closely spaced than in the "geometrical index" case.

The term "substantially homogeneous" as used herein to refer to a region of a fiber, means that the region is not considered to have features that provide, in terms of light guidance at wavelengths of operation of a fiber, a meaningful photonic bandgap or a meaningful geometrical index of refraction. By way of example and not limitation, the term is meant to include conventional doped or undoped host materials, such as, for example, an undoped silica host or a silica host doped with typical dopants (e.g., germanium, fluorine, boron, phosphorus, one or more rare earths) that raise, lower or leave substantially unaffected the index of refraction of the host material at wavelengths of operation. A substantially homogeneous region need not have a constant index of refraction throughout the region. For example, the graded index core of a conventional graded index fiber can be considered to be substantially homogeneous, although the refractive index can vary across at least part of the core.

The term "layer", as used herein, does not require that a layer be formed in a particular manner or have a particular thickness or composition; for example, one region can be formed over and subsequent to another substantially identical region and the two regions could be considered to form a single layer. The proper emphasis is on the intended functional characteristic(s) of a layer.

The different concepts and structures described above are typically alike in at least one aspect: regardless of whether a region (e.g., a cladding) of a fiber is substantially homogeneous, includes features having a large volume fraction such that the concept of geometric index is relevant, or provides a photonic bandgap, typically the region is disposed about another region (e.g., core) and has an effective index of refraction that is selected to be less than the effective index of refraction of the other region (the core) so as to tend to confine light to the region (the core) to facilitate the guidance of light thereby.

In certain embodiments of the invention an optical fiber, such as a cladding pumped optical fiber, comprises a core, a pump cladding disposed about the core, and a second cladding disposed about the pump cladding, wherein the second cladding includes an arrangement of features and surrounding material so as to provide a selected photonic bandgap for tending to confine pump light within the inner cladding Terms are used herein as understood by one of ordinary skill in the art, and definitions provided herein are as understood by one of ordinary skill in the art. For example, as used herein the term "optical", such as is used in the term "optical waveguide" or "optical fiber", is used to mean a waveguide or fiber, as the case may be, for use with electromagnetic energy, as is well understood by those of ordinary skill in the art. It is inappropriate for the term "optical" (or for the term "light"), as used herein, to be limited to the range of visible wavelengths, as is readily appreciated by one of ordinary skill, but perhaps not appreciated by one not of ordinary skill inclined to inappropriately rely solely on a layman's dictionary, which may restrict the terms "optical" or "light" to visible wavelengths.

Several features of the invention are described above and elsewhere herein. Not every specific combination of features according to which the invention can be practiced is explicitly enumerated herein. In general, it is understood by one of ordinary skill in the art that features described in conjunction with one embodiment can be included in any other embodiment described herein, excepting of course combinations of features that are mutually exclusive.

Further advantages, novel features, and objects of the invention will become apparent from the following detailed description of non-limiting embodiments of the invention when considered in conjunction with the accompanying FIGURES. For purposes of clarity, not every component is labeled in every one of the following FIGURES, nor is every component of each embodiment of the invention shown where illustration is not considered necessary to allow those of ordinary skill in the art to understand the invention.

BRIEF DESCRIPTION OF THE DRAWINGS

FIG. 1 schematically illustrates a cross section of an optical fiber article according to one embodiment of the present invention;

FIG. 2 schematically illustrates one embodiment of an apparatus for providing the optical fiber article of FIG. 1;

FIG. 3 schematically illustrates another embodiment of an apparatus for providing the optical fiber article of FIG. 1;

DETAILED DESCRIPTION

Figure 4A:
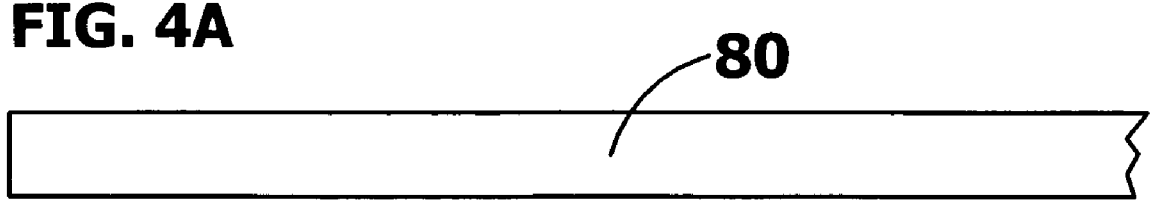
FIG. 4A schematically illustrates a sheet material that can be used to form one example of the second preform of FIG. 2 or FIG. 3.

FIG. 1 schematically illustrates a cross section of an optical fiber article 12 according to one embodiment of the present invention. The cross section shown in FIG. 1 is taken perpendicular to the longitudinal axis of the optical fiber article 12. The optical fiber article 12 can include an optical fiber 14, which can include at least a core, and a region 16 disposed about the optical fiber 14. The region 16 can contact the core of the optical fiber 14. The region 16 can protect the optical fiber 14, and/or can provide an optical cladding for the optical fiber 14. In some practices of the invention, the optical fiber 14 can include an optical cladding (e.g., a transparent glass cladding) disposed about the core as well as one or more protective coatings (e.g., acrylate polymer coatings) disposed about the cladding and/or the core, and the region 16 is disposed about the optical cladding and/or the protective coatings of the optical fiber 14. In one embodiment of the invention, the optical fiber 14 can include a glass core and an optical glass cladding disposed about the core, and the region 16 can comprise a polymer, such as polyimide, for protecting the optical fiber 14. The region 16 can provide a hermetic seal for the optical fiber 14. The region 16 can comprise a metal, such as by, for example, comprising a metal and a polymer.

The region 16 can be substantially homogeneous. The region 16 can be inhomogeneous and can comprise, for example, discrete regions of different compositions and/or optical properties at a wavelength of interest, such as, for example, a wavelength at which the optical fiber article is intended to propagate or guide electromagnetic energy. For example, the region 16 can comprises concentric rings or annuli, where the composition of one annulus or ring can be different than the composition of another annulus or ring.

FIG. 2 schematically illustrates one embodiment of an apparatus 20 for providing the optical fiber article 12 of FIG. 1. The heater 28, which can comprise a graphite furnace, heats one end of the optical fiber preform 32 to facilitate the drawing of the optical fiber 14 from the optical fiber preform 32. The apparatus 20 can include a device 38 for measuring the diameter of the optical fiber 14. The apparatus 20 can also include a device 42 (e.g., one or more "coating cups" including dies) for disposing one or more coatings (e.g., soft and hard acrylate polymer coatings known in the art) about the optical fiber 14. The apparatus 20 can also include a device (e.g., one or more ultraviolet lamps) for curing, at least in part, the coatings disposed about the optical fiber 14 by the device 38.

The apparatus 20 can include a second heater 50 for heating a second preform 52 for drawing the preform so as to dispose the region 16 about the optical fiber 14, where the region 16 is derived, at least in part, from the second preform 52. The second preform 52 can define the aperture 54, and the optical fiber 14 can pass through the aperture 54 for facilitating drawing the second preform 52 for disposing the region 16 about the optical fiber 14 so as to form the optical fiber article 12. The second preform 52 can comprise one or more of a polymer, a metal, or any other suitable material, alone or in combination.

The apparatus 20 can also include a device 64 (e.g., a delivery tube) for providing an adhesion promoter (e.g., a silane) for promoting adhesion of the region 16 to the optical fiber 14. The device 64 can deliver the adhesion promoter to or near the aperture 54. The optical fiber article 12 can be wound about drum, or spool, 60. Fiber vendors usually supply fiber so spooled. The apparatus 20 can include provision for drawing a selected degree of vacuum on the interior of the second preform 52. Such provision can include a feedthrough tube 68 in fluid communication with the interior of the second preform 52 and a sealing device 70 for sealing off the interior of the preform 52 so as to facilitate the drawing of the selected degree of vacuum, as indicated schematically in FIG. 2. The feedthrough tube 68 can be in fluid communication with a vacuum pump (not shown).

Typically, the apparatus 20 can be arranged on a tower. Draw towers for drawing conventional optical fibers from an optical fiber preform are well known in the art. The apparatus 20 can include other devices, such as a device for measuring the concentricity of the coatings disposed about the optical fiber 14 by the device 38, and/or a device for measuring the concentricity of the region 16 drawn from the second preform 52. Various drawing parameters (e.g., temperature of one or both of the heaters 28 and 50, the draw speed, the draw tension, etc.) can be controlled responsive to information provided by one or more measurement devices, such as the device 38 for determining the diameter of the optical fiber 14, so as to provide the optical fiber 14 and/or the optical fiber article 12 with desired properties.

Note that one or more of the devices 38, 40 and 42 can be disposed "downstream" of the second preform 52, as indicated schematically by the arrow 72, rather than "upstream", as shown in FIG. 2. In this instance, any coatings added by the coating device 40 will be disposed over the region 16, rather than the region 16 being disposed over one or more coatings added by the coating device 40. Of course, it is within the scope of the invention to add coatings that can form layers both upstream and downstream of the second preform 52.

As schematically illustrated in FIG. 3, in one embodiment of the invention, the second preform 52 can be located adjacent the heater 28 such that residual heat from the drawing of the optical fiber 14 from the preform 32 can contribute to or be solely responsible for supplying the heat for drawing the second preform 52 so as to dispose the region 16 about the optical fiber 14. Some of all of the heat can be carried by the optical fiber 14 as it leaves the region of the heater 28.

As shown in FIGS. 2 and 3, fabrication of the optical fiber 14 can be substantially contemporaneous with the disposing of the region 16 about the optical fiber 14 to form the optical fiber article 12 (e.g., drawing of the second preform 52 can occur on the same tower as the formation of the optical fiber, such as by draw, and/or can occur with the optical fiber 14 not having been previously spooled). "Substantially contemporaneous", as used in this context, is not to mean that the drawing of the second preform 52 cannot be subsequent to providing the optical fiber 14. Alternatively, the optical fiber 14 can be pre-made and hence simply be provided to the second preform 52 from a storage spool. The optical fiber 14 can be fabricated by any suitable method or combinations thereof, such as, for example, drawing the fiber from a preform, extruding the fiber, or forming the fiber using one or more crucibles, such as the dual nested crucible method well known in the art. Note that although FIGS. 2 and 3 show an optical fiber preform 32 that is separated from the second preform 52, in certain circumstances the second preform 52 could be disposed about the optical fiber preform 32 to form a composite preform that is then drawn to form the optical fiber article 12.

Figure 4B:
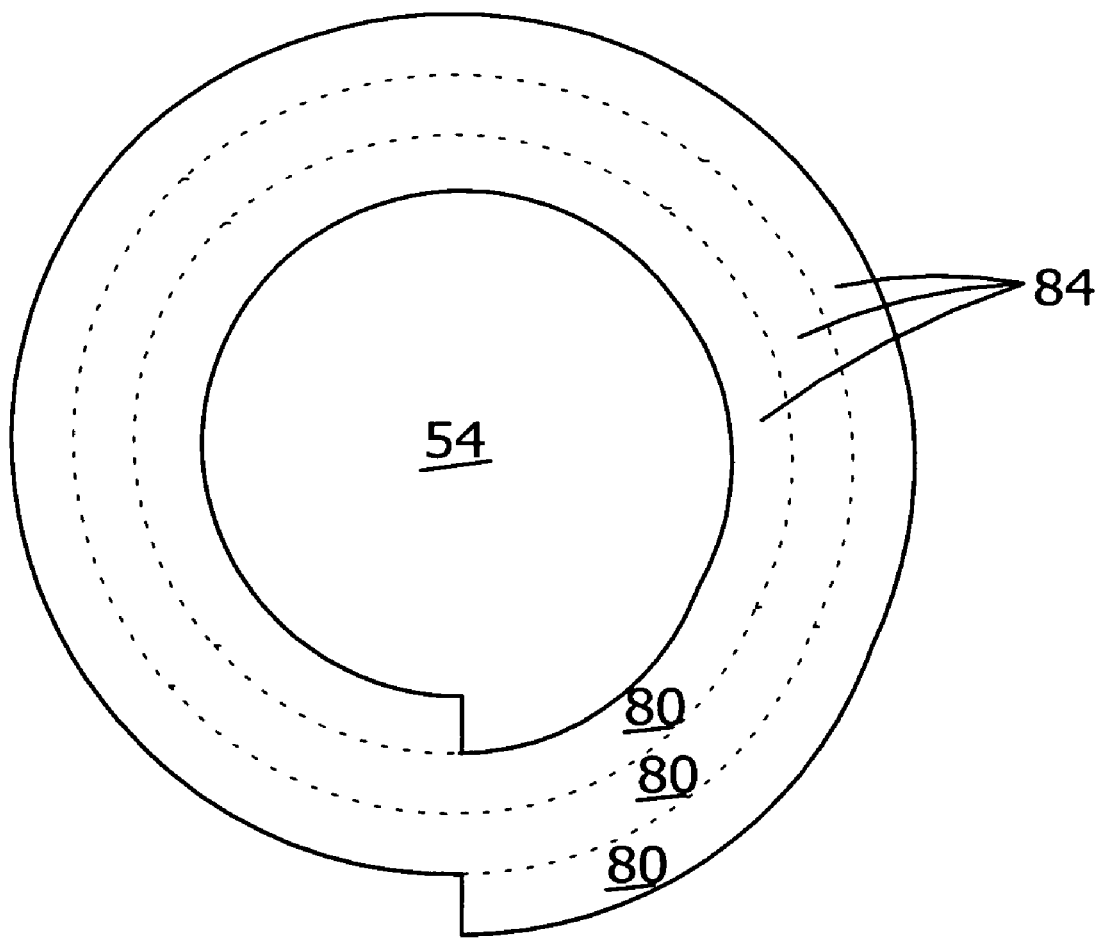
FIG. 4B is a cross section, taken in a plane perpendicular to the longitudinal axis of the of the optical fiber 14, of a second preform 52 of FIGS. 2 and 3, that can be formed from the sheet material of FIG. 4A.

FIG. 4A schematically illustrates a sheet material 80 that can be used to form one example of the second preform 52. The preform 52 can comprise a spiral 84 of the sheet material 80, and the sheet material can be rolled to form the spiral 84 and to define the aperture 54, as illustrated in FIG. 4B. The spiral 84 can be secured to reduce the tendency of the spiral 84 to unravel. The spiral 84 can be fused, such as by causing heating of all or a portion of the spiral 84, prior to drawing the preform 52 to dispose the region 16 about the optical fiber 14. The sheet material can comprise a polymer (e.g., a polyethersulfone). The sheet material can comprise a polyimide, such as, for example, Kapton™ or Cirlex™, both of which are available from DuPont. Polyimide tubing is available from Furukawa Electric.

Figure 5A:
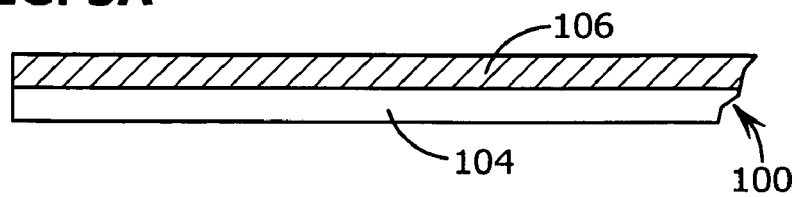
FIG. 5A schematically illustrates a second example of a sheet material that can be used to form a second example of the second preform of FIG. 2 or FIG. 3.
Figure 5B:
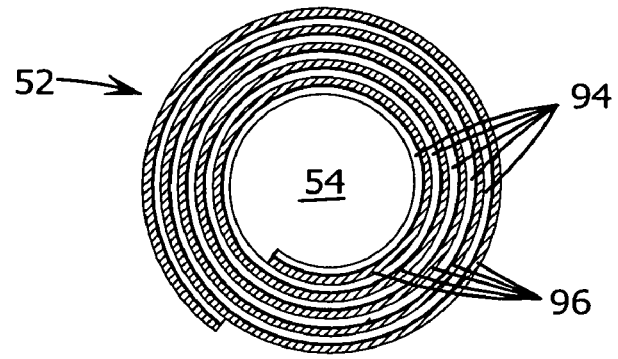
FIG. 5B is a cross section of a second preform that can be formed by the second sheet material of FIG. 5A.

FIG. 5B schematically illustrates a cross section of another example of a second preform 52, wherein the second preform 52 comprises first and second spirals, 94 and 96 respectively. The first spiral 94 can be wound from a first sheet material and the second spiral 96 can be wound from a second sheet material. The first and second sheet materials can be rolled together such that the first spiral 94 is inside of the second spiral 96, as shown in FIG. 5B. The first and second sheet materials can have substantially the same composition, or can have different compositions and can have different optical properties, such as different refractive indices. For example, the first sheet material can comprises a metal and the second sheet material can comprise a polymer, such as a polyimide. The region 16 will accordingly include first and second spirals corresponding at least in part to the first and second spirals of the preform from which the region 16 is drawn. The first and second spirals can be formed from a sheet material 100 shown in FIG. 5A, wherein the sheet material 100 comprises a first layer or sheet region 104 adhering to a second layer or sheet region 106, and the first sheet region 104 forms spiral 94 and the second sheet region 106 forms spiral 96. The first and second sheet regions 104 and 106 can comprise different compositions.

Figure 6:
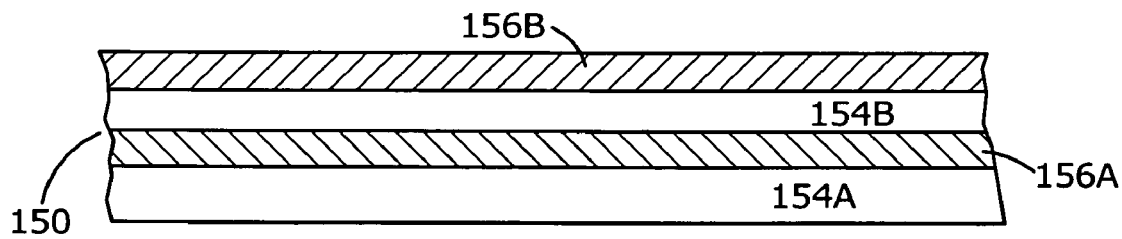
FIG. 6 illustrates a third example of a sheet material that can be used to form a third example of the second preform of FIG. 2 or FIG. 3.

In one embodiment of the invention, a preform, and hence the region 16, comprises at least three spirals, where two of the spirals are electrically conductive (i.e., are not insulating). A conductive spiral can consist of or comprise metals (e.g., a metalloid polymer), and are preferably electrically insulated from each other by another of the spirals, such as a polymer spiral, interposed between the two conductive spirals. Such a configuration may be useful in an optical fiber for power or signal delivery. See, for example, FIG. 6, which schematically illustrates an example of a sheet material 150 that can be rolled to provide a preform having such spirals, where the preform can then be drawn to provide a region 16 having such spirals. The sheet material 150 comprises insulating polymer layers 154A and 154B and conductive layers 156A and 156B.

Figure 7A:
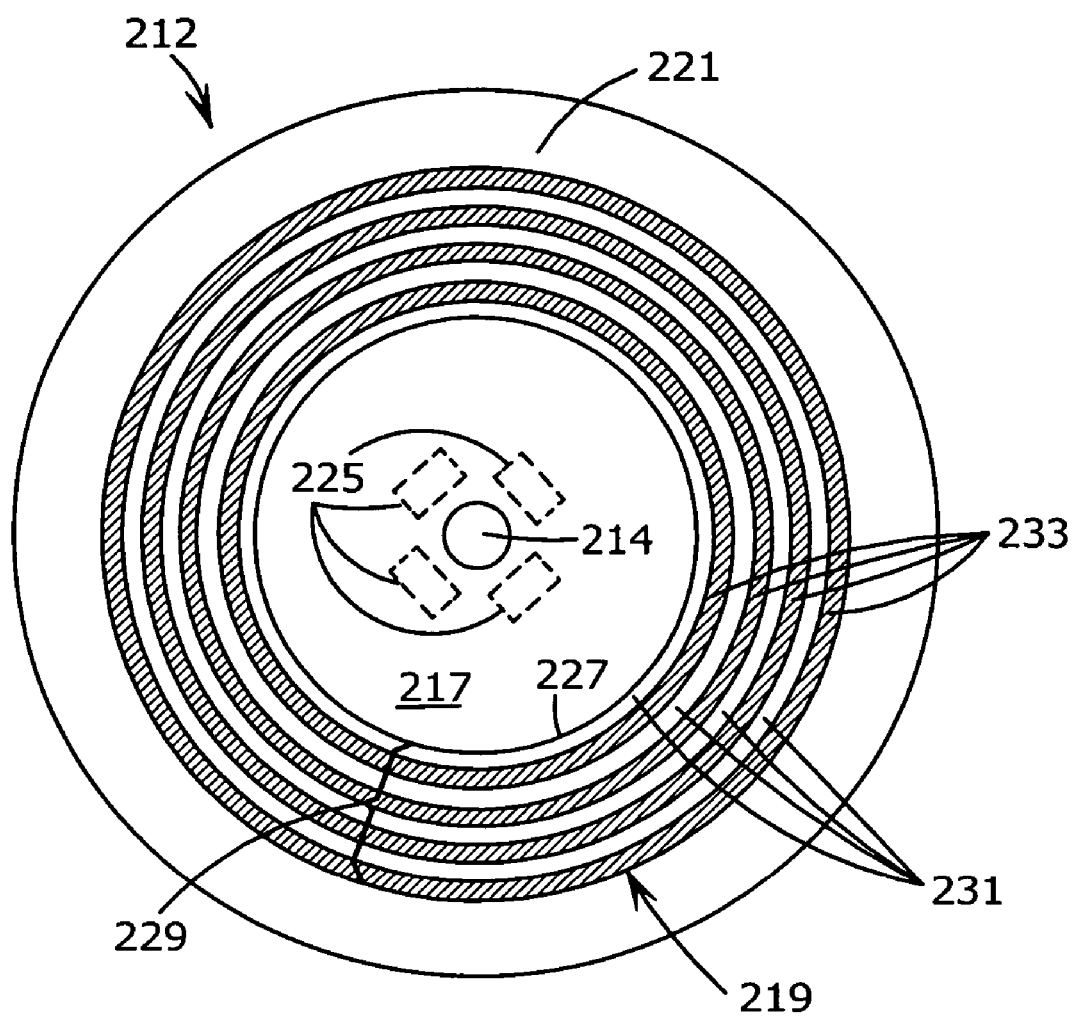
FIG. 7A schematically illustrates another embodiment of an optical fiber article according to the present invention.

FIG. 7A schematically illustrates a cross section of another embodiment of an optical fiber article 212 according to the present invention. The optical fiber article 212 can have a longitudinal axis, and the cross sectional view of the optical fiber article 212 presented in FIG. 7A can be taken perpendicular to the longitudinal axis. The optical fiber article 212 comprises a core 214, a first or inner cladding 217 disposed about the core and a second or outer cladding 219 disposed about the first cladding 217. The optical fiber article 212 can also include an outer region 221 disposed about the second cladding 219. The outer region 221 can provide mechanical strength. The outer region 221 can be derived from a glass tube, such as, for example, a silica glass tube typically used in making an optical fiber preform.

The core 214 can include one or more selected rare earths (atomic numbers 57-71) for absorbing selected wavelengths of light. In certain embodiments of the invention, the rare earth can provide light having a second or signal wavelength responsive to absorbing light (i.e., pump light) having a first or pump wavelength that is different (e.g., shorter) than the first wavelength. The rare earth is typically added as dopant to a host material, such as a host material of silica glass. An optical fiber article comprising a rare earth can form the basis of an optical fiber laser, optical fiber amplifier or superfluorescent source, for example, as is known in the art. Rare earths understood to be particularly of interested for fiber lasers, amplifiers and the like, can be one or more of erbium, ytterbium, thulium, and neodymium. Optical fiber articles comprising both erbium and ytterbium are known to be useful in certain applications, such as, for example, a laser or amplifier operating at an "eye safe" wavelength.

The first or inner cladding 217 can act as a pump cladding for receiving pump radiation for absorption of the pump light by the one or more rare earths comprised by the optical fiber article 212. Typically, one or both of the core 214 and the inner cladding 217 can comprise a rare earth. The inner cladding 217 can have an effective index of refraction that is less than the effective index of refraction of the core 214, and the second cladding 219 can have an effective index of refraction that is less than the effective index of refraction of the inner cladding 217.

The inner cladding 217 can have a relatively high cross sectional area and a rather high numerical aperture (NA) for increased capture of light from a pump light source having a high numerical aperture, and can facilitate delivery of such pump light to the one or more rare earths for absorption thereby. In one embodiment of the invention the inner cladding 217 can tend to confine light having a selected wavelength (e.g., the first or signal wavelength) to the core 214, but does not tend to so confine the light having the selected wavelength via a photonic bandgap effect, whereas the second cladding 219 provides a selected photonic bandgap for confining light (e.g., light having the second or pump wavelength) to a region about which the second cladding is disposed (e.g., the inner cladding 217 or an additional cladding interposed between the inner cladding and the second cladding). For example, the inner cladding 217 can be substantially homogeneous, and can consist essentially of silica glass or doped silica glass, or the inner cladding 217 can comprise features so as to confine light to the core 214 based on the geometrical index effect. For example, the inner cladding can comprise a plurality of isolated features 225, where each isolated feature includes an optical property (e.g., index of refraction) that is different than material adjacent the features (e.g., material of the cladding 217 surrounding each of the features) for providing said pump cladding with a selected geometric refractive index. The term "isolated", as used herein with reference to features is intended to distinguish the features from regions that substantially surround the core, such as the layers 231 and 233 comprised by the second cladding 219, described in more detail below.

In another embodiment of the invention, the inner cladding 217 is adapted to provide a selected photonic bandgap for tending to confine light having a selected wavelength to a region about which the inner cladding 217 is disposed (e.g., the core 214).

The second cladding 219 can have an inner perimeter 227. The second cladding 219 can comprise a plurality of layers 229 for providing the selected photonic bandgap. The plurality of layers 229 can include a first layer (e.g., one of the layers 231) having a different optical property than a second layer (e.g., one of the layers 233). For example, the layers 231 can each have a higher index of refraction than the layers 233. For example, layers 231 can have a lower index of refraction than layers 233. The layers 231 and 233 can alternate, as shown in FIG. 7A. The layers 231 and 233 can be adapted to provide a photonic bandgap selected for tending to confine light, such as, for example, pump light, within the inner perimeter 227 of the second cladding 219. As shown in FIG. 7A, the plurality of layers 229 can comprise a plurality of concentric closed rings ("closed" means that the ring closes on itself so there is no free end), where each of the layers 231 and 233 forms a closed ring and is concentric with the other layers.

It is known in the art that a selected region (i.e., the second cladding 219) can include an arrangement of layers of higher and lower index of refraction so as to provide a photonic bandgap that can tend to confine light to a region (i.e., a core, which can comprise air) about which the selected region is disposed. See the work of Yoel Fink of the Massachusetts Institute of Technology, Cambridge, Mass., USA (MIT), typically in conjunction with others, such as, for example, John Joannopoulos, also of MIT, and from the work of OmniGuide Inc., One Kendall Square, Building 100, Third Floor, Cambridge, Mass., 02139, USA (OmniGuide). See, in general, other patents, patent applications and publications of which Yoel Fink or John Joannopoulos is an inventor or author or that are associated with OmniGuide Inc. See, for example, U.S. Pat. No. 6,130,780, entitled "High Omnidirectional Reflector", issued on Oct. 10, 2000 to inventors Joannopoulos, Fan, Winn and Fink, and assigned at the time of issue to MIT. More particularly, see U.S. Pat. No. 6,463,200, entitled "Omnidirectional Multilayer Device for Enhanced Optical Waveguiding", issued on Oct. 8, 2002 to inventors Fink, Fan, Thomas, Chen and Joannopoulos and assigned at the time of issue to MIT (the '200 patent). The arrangement of layers can form a dielectric mirror.

The arrangement of layers can include closed concentric cylinders or rings with alternating indices of refraction $n_1$, $n_2$ that surround the core of dielectric material no, such as air. See, for example, FIG. 6A of the '200 patent and the accompanying discussion of FIG. 6A. Adjacent layers can have different thicknesses. Note that an exemplary embodiment of the '200 patent would involve each layer consisting of different material and corresponding different layer thickness, and the parameters of the multilayer film can be chosen such that light from any relevant incident angle and relevant polarization is completely reflected by the arrangement of layers for a selected range of signal frequencies.

The arrangement of layers can include at least one layer that is continuous and that forms a spiral when viewed in cross section. See, for example, PCT Patent Application PCT/US2003/039344, entitled "High Power, Low-Loss Fiber Waveguide" and published in English as WO 2004/052078 A2 on Jun. 24, 2004 in the names of inventors Benoit, Fink, Joannopoulos, Hart and Temelkuran. Such an arrangement of layers can be drawn from a preform that includes a spiral, and such a preform can be formed from a suitable sheet material, as taught in the foregoing published PCT Patent Application. Accordingly, in one embodiment of the invention, the plurality of layers 229 can include at least a first layer that forms a spiral about the longitudinal axis. Typically, the plurality of layers 229 will include two layers that spiral about the longitudinal axis, where one of the layers spirals inside the other of the layers. The plurality of layers can appear as the spiral of layers 94 and 96 shown in FIG. 5B.

It is not necessary to use an arrangement of layers to provide a region of an optical fiber with a selected photonic bandgap. A region can provide a selected photonic bandgap by including appropriately designed longitudinally extending features (e.g., voids) in an appropriate host material (e.g., silica glass). See, for example, papers, patents and patent applications in the names of one or more of Timothy Birks, Phillip Russell and Jes Broeng. More particularly, see published PCT Patent Application PCT/GB98/01782, entitled "Single Mode Optical Fibre" and published in English as WO 99/00685 on Jan. 7, 1999 in the names of inventors Birks, Knight and Russell; published PCT Patent Application PCT/DK99/00193, entitled "A Photonic Band Gap Fibre" and published in English as WO 99/64904 on Dec. 16, 1999 in the names of inventors Broeng, Barkou, and Bjarklev; published PCT Patent Application PCT DK/99/00279, entitled "Microstructured Optical Fibres" and published in English as WO 99/64903 on Dec. 16, 1999 in the names of inventors Broeng, Barkou and Bjarklev; and published PCT Patent Application PCT/GB00/04744, entitled "Improvements in or Relating to Photonic Crystal Fibres" and published in English as WO 01/42829 on Jun. 14, 2001 in the names of inventors Russell, Birks, Knight and Mangan. See also U.S. patent application U.S. 2003/0165313, entitled "Optical Fibre with High Numberical Aperture, Method of its Production, and Use Thereof", published Sep. 4, 2003 in the names of inventors Broeng, Bjarklev, Libori, Folkenberg and Vienne.

Figure 7B:
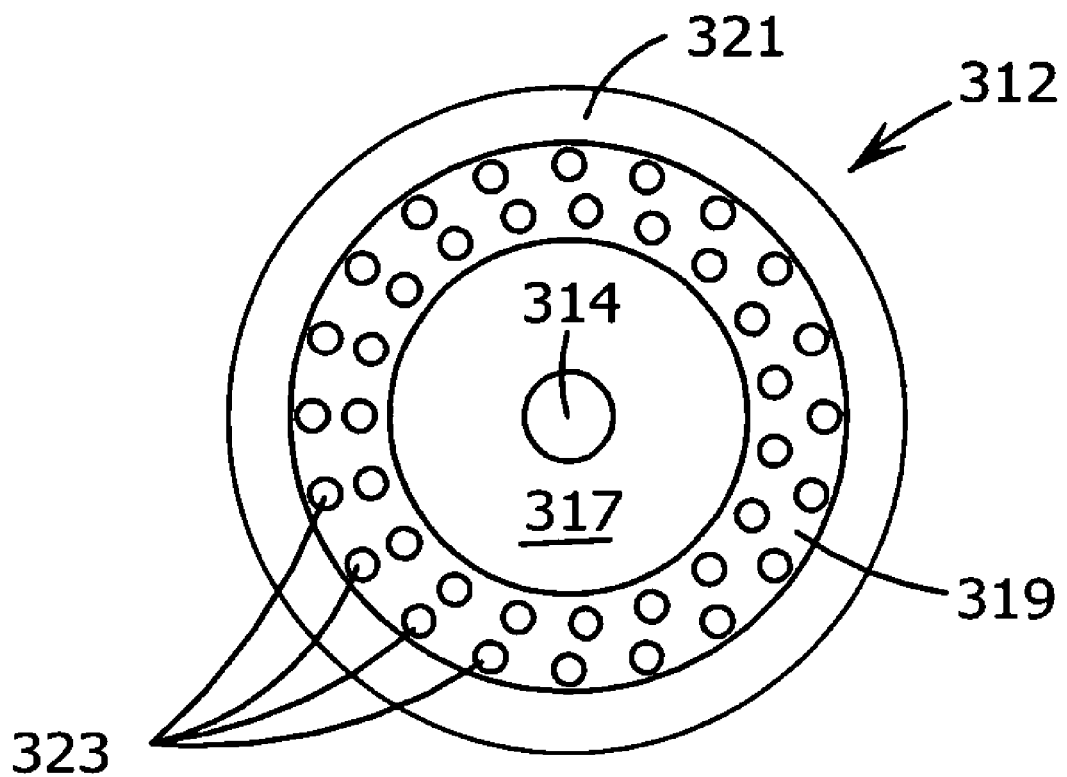
FIG. 7B schematically illustrates an additional embodiment of an optical fiber article according to the present invention.

Accordingly, see FIG. 7B, which schematically illustrates another embodiment of the present invention. The optical fiber article 312 can include a core 314, an inner cladding 317 disposed about the core 314, and a second cladding 319 disposed about the inner cladding 317. The optical fiber article 312 can conform to the description of the optical fiber article 212 above in conjunction with FIG. 7A, except that the second cladding 319 comprises a plurality of isolated features 323 having an optical property (e.g., index of refraction) that is different than the material adjacent the features 323 for providing the selected photonic bandgap for tending to confine light having a selected wavelength to a region (e.g., the inner cladding 317) about which the second cladding 319 is disposed. The isolated features 323 can extend longitudinally, and can comprise longitudinally extending voids.

Figure 7C:
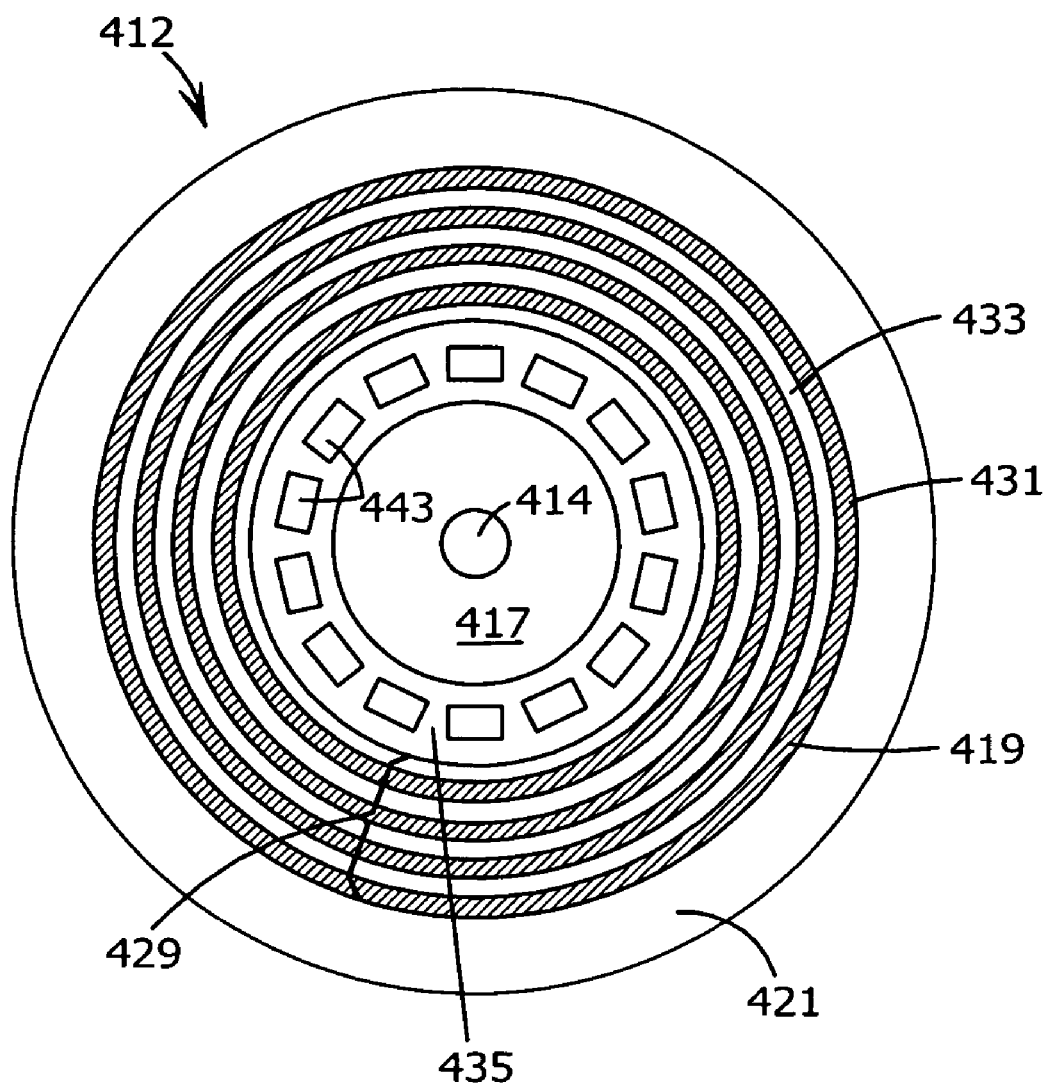
FIG. 7C schematically illustrates a further embodiment of an optical fiber article according to the present invention.

FIG. 7C illustrates another embodiment of an optical fiber article according to the present invention. The optical fiber article 412 comprises a core 414, and inner cladding 417 disposed about the core 414, which inner cladding 417 can be a pump cladding, a second cladding 419 disposed about the inner cladding 417, and an additional cladding 435 disposed about the inner cladding and about which the second cladding 419 is disposed. The additional cladding 435 can comprise an effective index of refraction that is less than the effective index of refraction of the inner cladding 417. The inner cladding 417 can be substantially homogeneous.

The additional cladding 435 can comprise a plurality of isolated features 443, where each of the features has an optical property (e.g., index of refraction) that is different than material adjacent the feature for providing said additional cladding with a selected geometric refractive index (or a selected photonic bandgap) for tending to confine pump light to the inner cladding 417. The plurality of isolated features 443 can comprise a plurality of longitudinally extending voids. The description of the various aspects of the optical fiber articles 212 and 312 can apply to the optical fiber 412 as well, and the description is not repeated in the same detail here. The second cladding can provide a selected photonic bandgap for tending to confine light (e.g., pump light) to a region about which the second cladding 419 is disposed (e.g., the additional cladding 435).

The second cladding 419 can include a plurality of layers 429 including a first layer 431 having a different optical property than a second layer 433 for providing the photonic bandgap, as, for example, is described in conjunction with the layers of FIG. 7A. The first layer 431 can have a higher index of refraction than the second layer 433. The plurality of layers 429 can include alternating layers of different, such as high and low, refractive indices. The plurality of layers can comprise a plurality of concentric closed rings, as shown in FIG. 7C, or can comprise one or more layers that form one or more spirals, as noted above in conjunction with the discussion of FIGS. 7A and 7B. The optical fiber article 412 can include a region 421 disposed about the core, inner, second and additional claddings for providing structural support. A region (e.g., the second cladding) of the optical fiber article 412 can include a plurality of isolated features, such as longitudinally extending voids; which voids can comprise air, for contributing to provision of the photonic bandgap of the second cladding. The second cladding 419 can include the isolated features in addition to, or in lieu of, the plurality of layers 429.

A region of a fiber according to the invention can include one or more elements or materials. Such elements or materials can be, for example, included as dopants in a host or background material. For example, it is well known in the art to raise the index of refraction of silica by doping the silica with germanium. One of ordinary skill in the art understands that a material or element can be combined with or incorporated into another material, such as a host material, according to a chemical formulation that depends on materials in question and/or on processing parameters. For example, when the host material is silica glass, most of the germanium is understood to be typically incorporated as gernania or $GeO_2$. Similarly, it is understood that boron is typically incorporated as $B_2O_3$. However, the invention is not limited to glass hosts or silica glass hosts, and can be practiced with other types of materials as host, such as plastics or other types of glasses, such as chalcogenide glasses or fluoride or phosphate glasses, wherein germanium or other elements are incorporated into different compounds than those specifically noted above. Stating that a fiber includes a material, such as boron, for example, means that the material is included in some form in the fiber, where it is understood that the form can be different, depending on the circumstances.

Those skilled in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not expressly taught as mutually inconsistent, is included within the scope of the present invention.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 7th Edition, Revision.

Having described the invention, what is claimed as new and to be secured by Letters Patent is:

1. An optical fiber article having a longitudinal axis, comprising:
   a core for propagating light having a first wavelength;
   a pump cladding disposed about said core and for propagating pump light having a wavelength different than the first wavelength, said pump cladding tending to confine light having the first wavelength to the core but not tending to confine the light having the first wavelength via a photonic bandgap effect; and
   a second cladding disposed about said pump cladding, said second cladding providing a selected photonic bandgap for tending to confine pump light within a region about which said second cladding is disposed.

2. The optical fiber article of claim 1 wherein said optical fiber article comprises a rare earth.

3. The optical fiber article of claim 2 wherein said rare earth comprises ytterbium.

4. The optical fiber article of claim 1 wherein said pump cladding is substantially homogeneous.

5. The optical fiber article of claim 1 wherein said pump cladding comprises a plurality of isolated features each having an index of refraction that is different than material adjacent the features for providing said pump cladding with a selected geometric refractive index.

6. The optical fiber article of claim 1 wherein said second cladding comprises a plurality of isolated features each having an index of refraction that is different than material adjacent the features.

7. The optical fiber article of claim 6 wherein said plurality of isolated features comprises a plurality of longitudinally extending voids.

8. The optical fiber article of claim 1 wherein said second cladding comprises a plurality of layers including a first layer having a different optical property than a second layer.

9. The optical fiber article of claim 8 wherein said plurality of layers includes at least a first layer that forms a spiral about the longitudinal axis.

10. The optical fiber article of claim 8 wherein said plurality of layers comprises a plurality of concentric closed rings.

11. The optical fiber article of claim 1 comprising an additional cladding disposed about said pump cladding, said second cladding being disposed about said additional cladding, said additional cladding comprising an effective index of refraction that is less than the effective index of refraction of said pump cladding.

12. The optical fiber article of claim 11 wherein said additional cladding comprises a plurality of isolated features each having an index of refraction that is different than material adjacent the feature for providing said additional cladding with a selected geometric refractive index for tending to confine pump light to said pump cladding.

13. The optical fiber article of claim 12 wherein said plurality of isolated features comprises a plurality of longitudinally extending voids.

14. The optical fiber article of claim 1 wherein said second cladding is adjacent said pump cladding and said region to which said second cladding tends to confine pump light comprises said pump cladding.

* * * * *